(12) United States Patent
Archer et al.

(10) Patent No.: US 8,396,317 B1
(45) Date of Patent: Mar. 12, 2013

(54) ALGORITHM MODIFICATION METHOD AND SYSTEM

(75) Inventors: Robert Archer, Seattle, WA (US); Charles F. Rose, III, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 611 days.

(21) Appl. No.: 12/613,415

(22) Filed: Nov. 5, 2009

(51) Int. Cl.
*G06K 9/40* (2006.01)
*G06K 9/36* (2006.01)
(52) U.S. Cl. ........................ 382/261; 382/276
(58) Field of Classification Search .................. 382/276, 382/291, 293, 295, 260–265
See application file for complete search history.

(56) References Cited

U.S. PATENT DOCUMENTS

| | | | |
|---|---|---|---|
| 6,407,775 B1* | 6/2002 | Frink et al. | 348/443 |
| 7,379,623 B2* | 5/2008 | Rudolph | 382/293 |
| 2002/0067864 A1* | 6/2002 | Matsuhira | 382/300 |
| 2004/0240755 A1* | 12/2004 | Wong et al. | 382/293 |
| 2010/0260435 A1* | 10/2010 | Orlick | 382/266 |

OTHER PUBLICATIONS

Shantzis, Michael A., "A Model fo Efficient and Flexible Image Computing", *SIGGRAPH*, ISBN 0-89791-667-0,(1994),8 pgs.

* cited by examiner

*Primary Examiner* — Aaron W Carter
(74) *Attorney, Agent, or Firm* — Schwegman Lundberg Woessner P.A.

(57) ABSTRACT

An analysis module accesses an input image, identifies an algorithm to be used to generate an output image from the input image, analyzes the algorithm, and determines a pixel offset of the algorithm. A generation module identifies a region of the output image in which output pixels are to be generated without an edge-checking operation. The generation module generates a modified version of the algorithm that omits the edge-checking operation and generates the output image by using the modified version to generate output pixels in the identified region.

19 Claims, 10 Drawing Sheets

ALGORITHM MODIFICATION METHOD AND SYSTEM

TECHNICAL FIELD

The subject matter disclosed herein generally relates to the processing of images. Specifically, the present disclosure addresses systems and methods involving an algorithm modification machine.

BACKGROUND

Images, whether still images or moving images (e.g., movies or video), are often represented as arrangements of picture elements called "pixels." For example, a photograph printed on photographic paper may be scanned and represented in electronic form as an image composed of 307,200 pixels, arranged in a rectangle 640 pixels in width and 480 pixels in height. As another example, an "8 megapixel" digital camera may capture a rectangular image composed of over 8 million pixels. As a further example, a video camcorder may capture a video clip as a sequence of images, all 720×480 pixels in size. As a further example, a computer that is executing animation software may generate a movie clip composed of multiple 1920×1080 pixel images.

An image may be processed to generate another image. Specifically, an image modification algorithm, for example, a "filter algorithm" or simply a "filter," may be used to generate an output image by modifying an input image. The input image is composed of input pixels, and the output image is composed of output pixels. The output image need not have the same size, shape, or dimensions as the input image, or even the same visual appearance for that matter. For example, filters may be used to brighten the input image, darken the input image, or alter the color of the input image to be more reddish or greenish in appearance.

BRIEF DESCRIPTION OF THE DRAWINGS

Some embodiments are illustrated by way of example and not limitation in the figures of the accompanying drawings in which.

DETAILED DESCRIPTION

Figure 1:
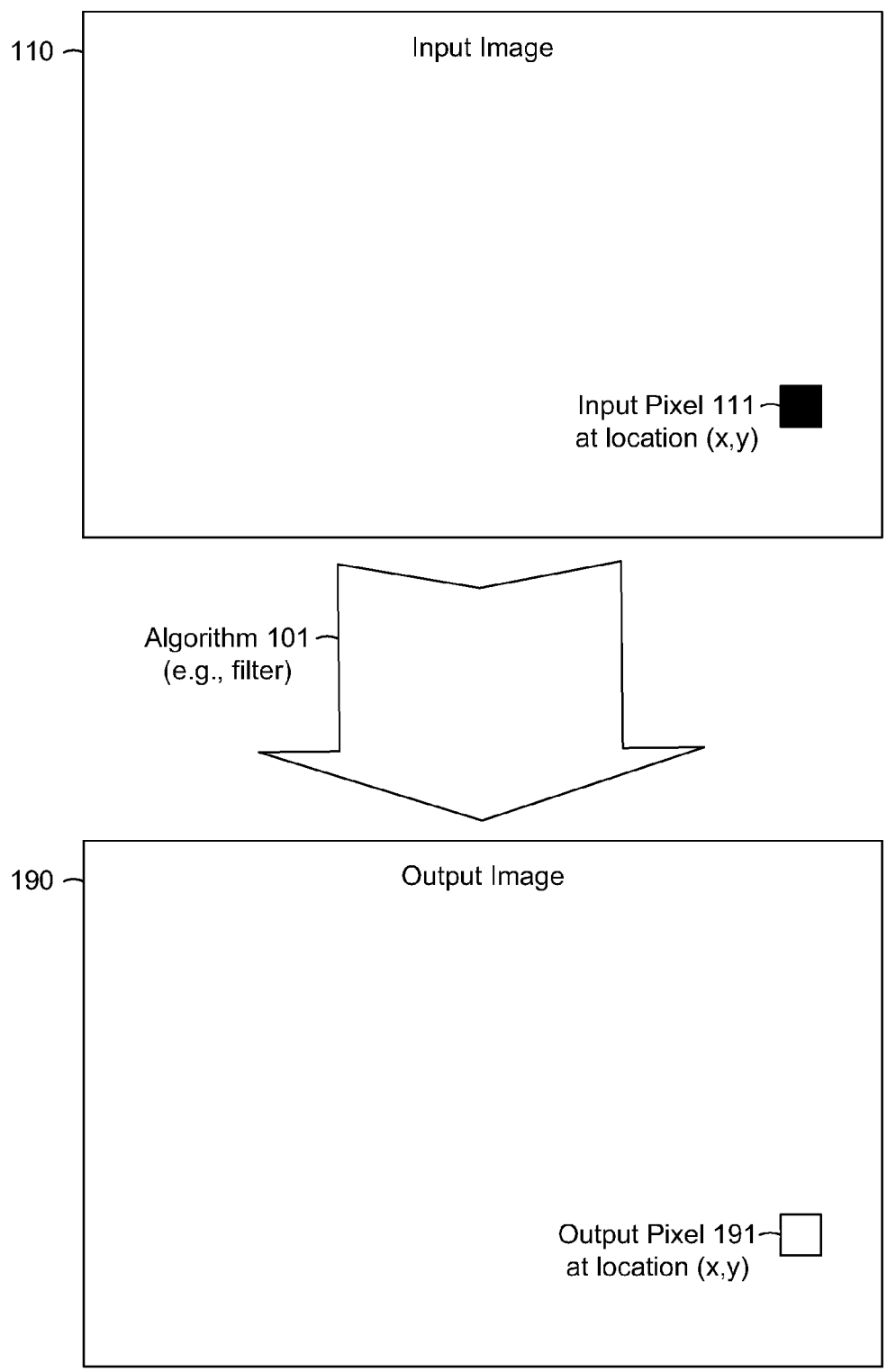
FIGS. 1-5 are diagrams illustrating operation of an image modification algorithm to generate an output image from an input image, according to some example embodiments.

Example methods and systems are directed to an algorithm modification machine. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An algorithm modification machine may be implemented using a computer system configured by software. The computer system may be a general-purpose computer configured by the software as a special-purpose computer able to execute any one or more of the methodologies described herein.

The algorithm modification machine accesses an input image stored in a memory of the computer system and identifies an image modification algorithm with which to generate an output image by modifying the input image. The image modification algorithm, in some example embodiments, is a filter and embodied in a set of instructions to generate an output pixel value based on an input pixel value. The output pixel value corresponds to an output pixel having an output pixel location within a coordinate space, and the input pixel corresponds to an input pixel having an input pixel location within the same coordinate space. The image modification algorithm includes an instruction to determine the input pixel location relative to an edge of the input image, which is an operation called "edge-checking"

The algorithm modification machine analyzes the image modification algorithm and determines a pixel offset that is characteristic of, and corresponds to, the image modification algorithm. The pixel offset includes a pixel distance between the input pixel location and the output pixel location. The pixel offset also includes a direction and, having a direction and a magnitude (e.g., the pixel distance), may thus be regarded as a vector (e.g., from the output pixel location to the input pixel location, or vice versa). The algorithm modification machine identifies an output region of the output image, based on the pixel offset, in which output pixel values may be generated using a modified version of the image modification algorithm that does not perform the edge-checking operation. In some example embodiments, the edge-checking operation is thus considered unnecessary for all output pixels within the output region.

The algorithm modification machine generates the modified version of the image modification algorithm by omitting the instruction to perform the edge-checking operation. The modified version is determined to correspond to the output region of the output image, and this correspondence may be stored in a database. Additionally, the algorithm modification machine may identify an input region of the input image as representative of the output region of the output image. The modified version may be determined to correspond to the input region, and this correspondence may also be stored in the database. Furthermore, the algorithm modification machine may store the modified version and its corresponding pixel offset in the database.

Additionally, the algorithm modification machine generates the output image based on the input image, using the modified version of the image modification algorithm to generate output pixel values for the identified output region of the output image. For each output pixel value to be generated, an input pixel is selected using the pixel offset, and the output pixel value is generated based on an input pixel value of that input pixel. If the output pixel is located in the output region that corresponds to the modified version of the image modification algorithm, the modified version is used to generate the output pixel value. This has the effect of eliminating the edge-checking operation when generating output pixels in the identified output region, as well as eliminating any subsequent operations that depend on the result of the edge-checking operation.

FIGS. 1-5 are diagrams illustrating operation of an image modification algorithm 101 to generate an output image 190 from an input image 110, according to some example embodiments. The input image 110 embodies input data (e.g., input pixel values) to be processed using the algorithm 101. The output image 190 embodies output data (e.g., output pixel values) to be generated using the algorithm 101. As shown in FIG. 1, the input image 110 includes an input pixel 111, and the output image 190 includes an output pixel 191.

The algorithm 101 is a mathematical function embodied in a set of instructions (e.g., software) that, in some example embodiments, implement a filter for image processing. The algorithm 101 is used to generate the output image 190 by generating output pixel values of output pixels (e.g., output pixel 191).

As a mathematical function, the algorithm 101 generates output from input. As shown in FIG. 1, the algorithm 101 generates an output pixel value that corresponds to the output pixel 191. To do this, the algorithm 101 takes as its input at least one input pixel value that corresponds to at least one input pixel (e.g., input pixel 111).

As used herein, a "pixel" is a picture element with at least one corresponding pixel value. For example, a pixel in a black-and-white image may have a brightness value as its singular pixel value. As another example, a pixel in a color image may have three pixel values that respectively indicate relative strengths of red, green, and blue color components (e.g., in RGB color space). As a further example, the three pixel values may indicate brightness and two mathematical representations of color information (e.g., in YUV color space, or in YCrCb color space). In some example embodiments, a pixel value represents a transparency component (e.g., an alpha component). According to certain example embodiments, a pixel value may represent a black level component (e.g., in CYMK color space). In general, a pixel may have any number of components, including color components and non-color components. In various example embodiments, a component may represent metadata of the pixel.

The input pixel 111 and the output pixel 191 may each have one or more pixel values. For simplicity of description, FIG. 1 shows only one input pixel 111, but the algorithm 101 may use one or more input pixel values from one or more input pixels as some or all of its input. Similarly, the output pixel 191 may have one or more pixel values, and the algorithm 101 may generate these one or more output pixel values. In the interest of clarity, however, the following discussion describes operations of the algorithm 101 to generate an output pixel value of the output pixel 191 based on an input pixel value of the input pixel 111.

The output pixel 191 has an output pixel location (x, y) within a coordinate space. This coordinate space may be applied to both the input image 110 and the output image 190. As shown in FIG. 1, the input pixel 111 has an input pixel location (x, y), which is the same pixel location as the output pixel 191 in the coordinate space. The input pixel 111 need not have the same pixel location as the output pixel 191.

Figure 2:
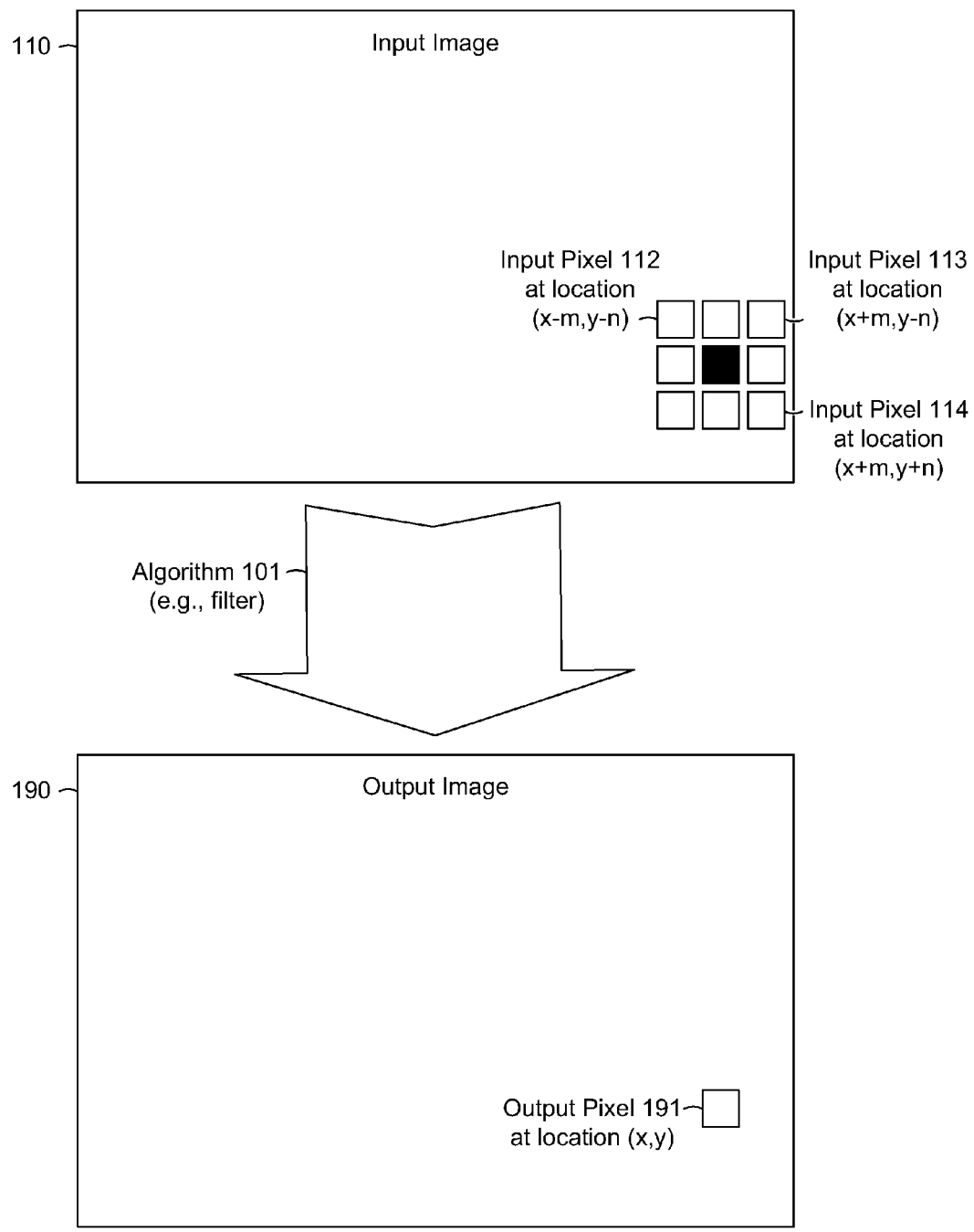

As shown in FIG. 2, the algorithm 101 may generate the output pixel value of the output pixel 191 based on input pixel values from multiple input pixels 112-114. Three of the input pixels 112, 113, and 114 are not located at the same pixel location (x, y) as the output pixel 191. For example, the algorithm 101 may implement a blur filter and accordingly determine an average of several input pixel values from pixels surrounding the pixel location (x, y) of the output pixel 191 (e.g., take an arithmetic mean of input pixel values from all nine input pixels shown in FIGS. 1-2 (e.g., input pixels 111-114).

As noted above, an input pixel (e.g., an input pixel 112 at location (x−m, y−n)) need not have the same pixel location (x, y) as the output pixel 191. Indeed, with respect to the coordinate space, an input pixel may be quite some distance removed from its corresponding output pixel. The pixel location of an input pixel, relative to its corresponding output pixel, is a characteristic of the algorithm 101. This characteristic is denoted herein as a "pixel offset."

As shown in FIG. 2, two of the input pixels for the algorithm 101 are input pixels 113 and 114, which are located respectively at (x+m, y+n) and (x+m, y−n). If the output pixel 191 at location (x, y) is sufficiently distant from the right edge of the input image 110, input pixel values from input pixels 113 and 114 are representative of actual image data from the input image 110. As a result, these input pixel values are valid and usable as input to the algorithm 101.

Figure 3:
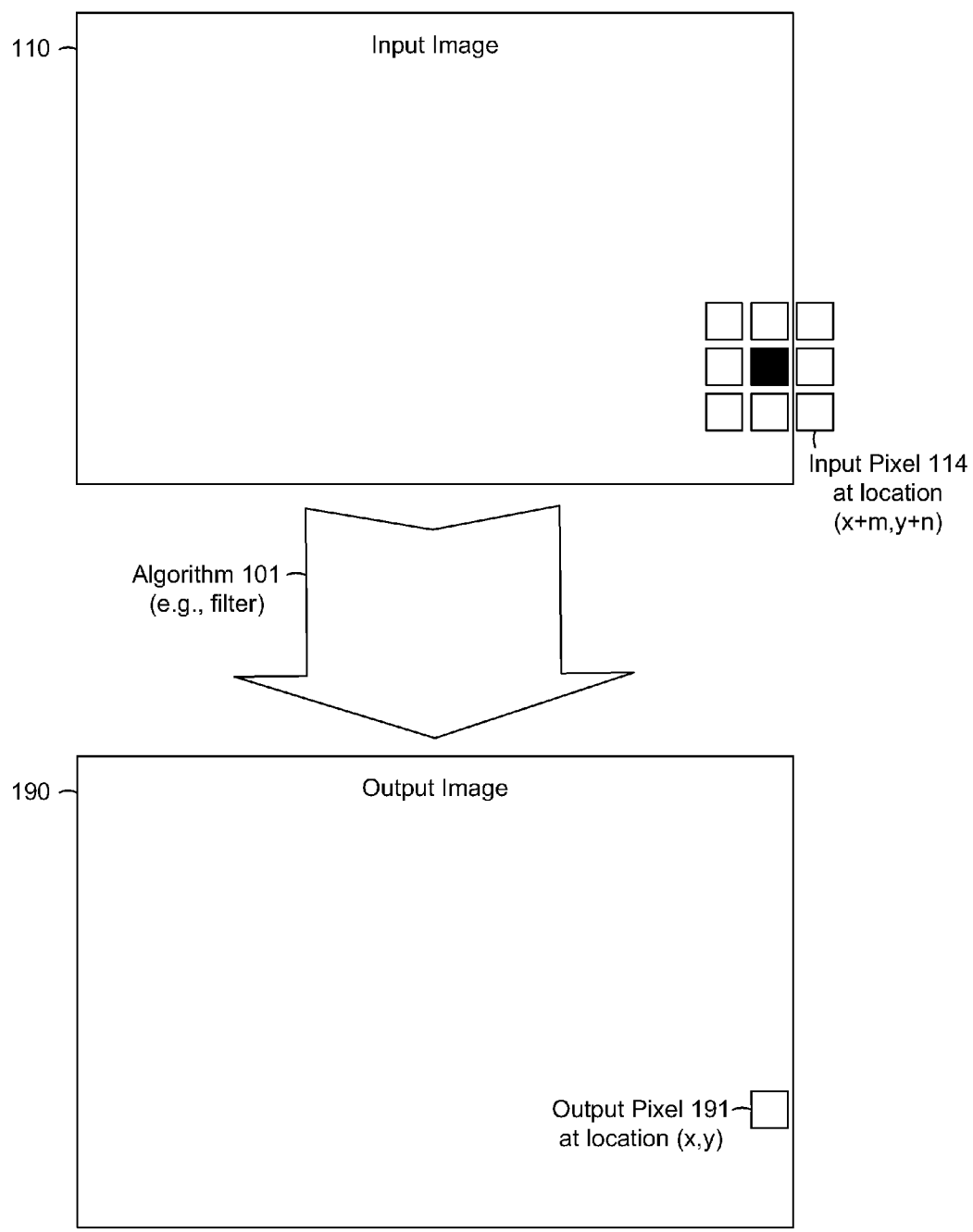

However, as shown in FIG. 3, if an input pixel 114 is outside of the input image 110, the input pixel value of that input pixel 114 may be unusable (e.g., invalid, unreliable, or otherwise unsuitable) as an input to the algorithm 101 for the purpose of generating the output pixel value of the output pixel 191. For example, the input pixel value of the input pixel 114 may be garbage data, unknown data, or default data (e.g., transparent black), or any combination thereof.

Figure 4:
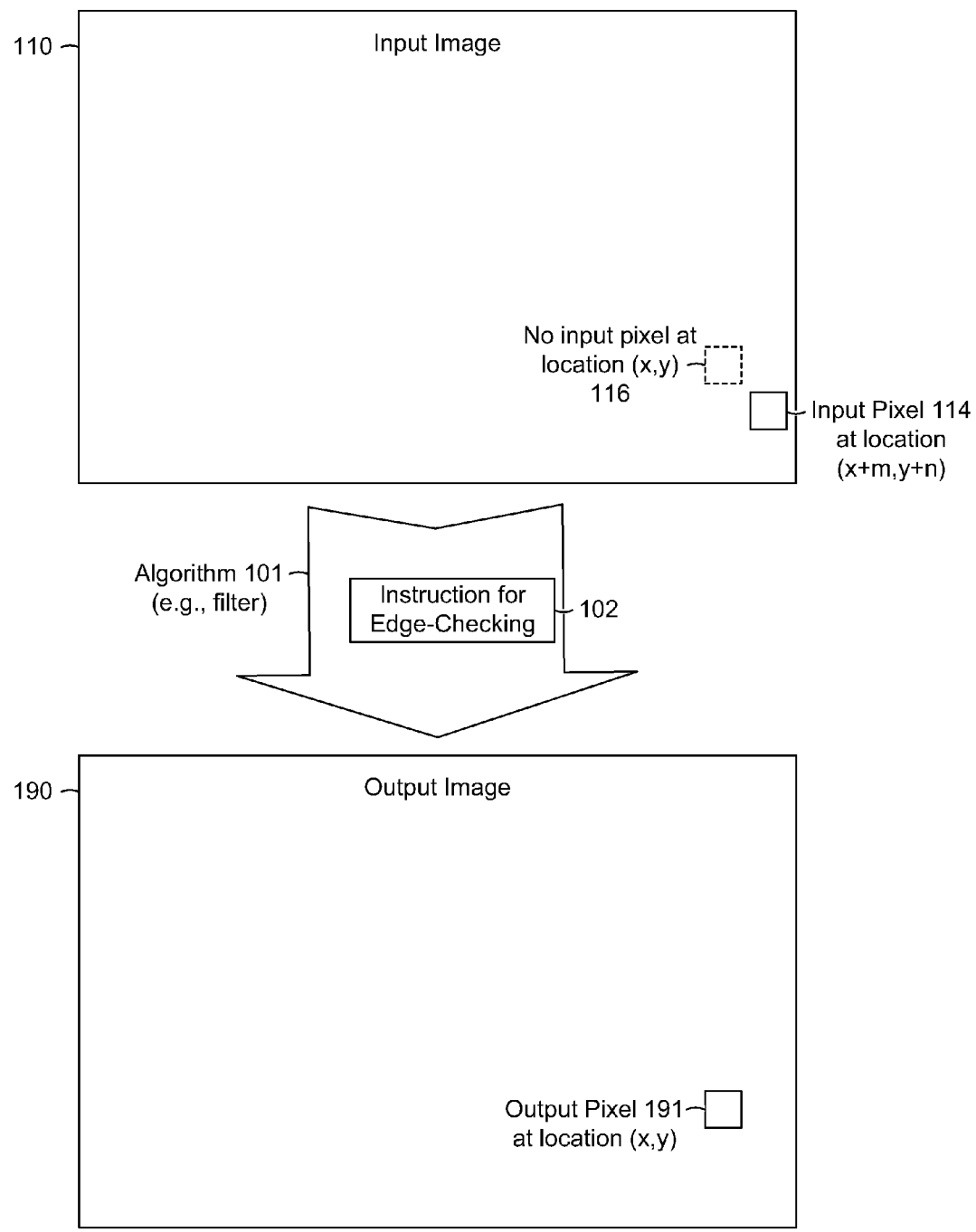

As shown in FIG. 4, generation of an output pixel value for the output pixel 191 at a particular pixel location (x, y) need not depend on any input pixel being located at that pixel location (x, y). FIG. 4 shows no input pixel at location (x, y) 116, even though the output pixel 191 is located at pixel location (x, y). Instead, the algorithm 101 uses only one input pixel 114, which is at pixel location (x+m, y+n). If the output pixel 191 is located such that the input pixel 114 is inside of the input image 110, the input pixel value of the input pixel 114 is valid and usable. However, if the output pixel 191 is located such that the input pixel 114 is outside of the input image 110, the input pixel value of the input pixel 114 is not usable.

To avoid processing an unusable input pixel value, the algorithm 101 includes an instruction 102 (or a set of instructions) to perform an edge-checking operation. In some example embodiments, the algorithm 101 includes multiple instructions (e.g., instruction 102) to respectively perform multiple edge-checking operations (e.g., with respect to the upper edge of the input image 110, the right edge of the input image 110, the lower edge of the input image 110, the left edge of the input image 110, multiple edges of the input image 110 at the same time, etc.).

The edge-checking operation may determine that the input pixel 114 is located inside the input image 110, as shown in FIGS. 2 and 4. Alternatively, the edge checking operation may determine that the input pixel 114 is located outside the input image 110, as shown in FIG. 3. The algorithm 101 may include further instructions to perform further operations in response to this determination. For example, the algorithm 101 may discard any unusable input pixel values and process only usable input pixel values. As another example, the algorithm 101 may alter the processing of the usable input pixel values (e.g., modifying one or more weighting factors applied to a weighted averaging function). As a further example, the algorithm 101 may replace an unusable input pixel value with a default value. One further example is called "clamp to edge" and involves substituting an unusable input pixel value with an input pixel value from the nearest input pixel located inside the input image 110.

The instruction to perform edge-checking operation, as well as any instructions to perform further operations in response to the edge-checking determination, may contribute significantly to consumption of computing resources during image processing using the algorithm 101. This contribution is typically multiplied by the number of pixels to be processed. For example, a 1920×1080 pixel image (e.g., high-definition (HD) video) contains over 2 million pixels. Accordingly, a reduction in this consumption of computing resources may be facilitated by eliminating the edge-checking operation, and along with it, any further operations that depend on the edge-checking operation, in situations where there is no possibility that the input pixel 114 is located outside of the input image 110.

Figure 5:
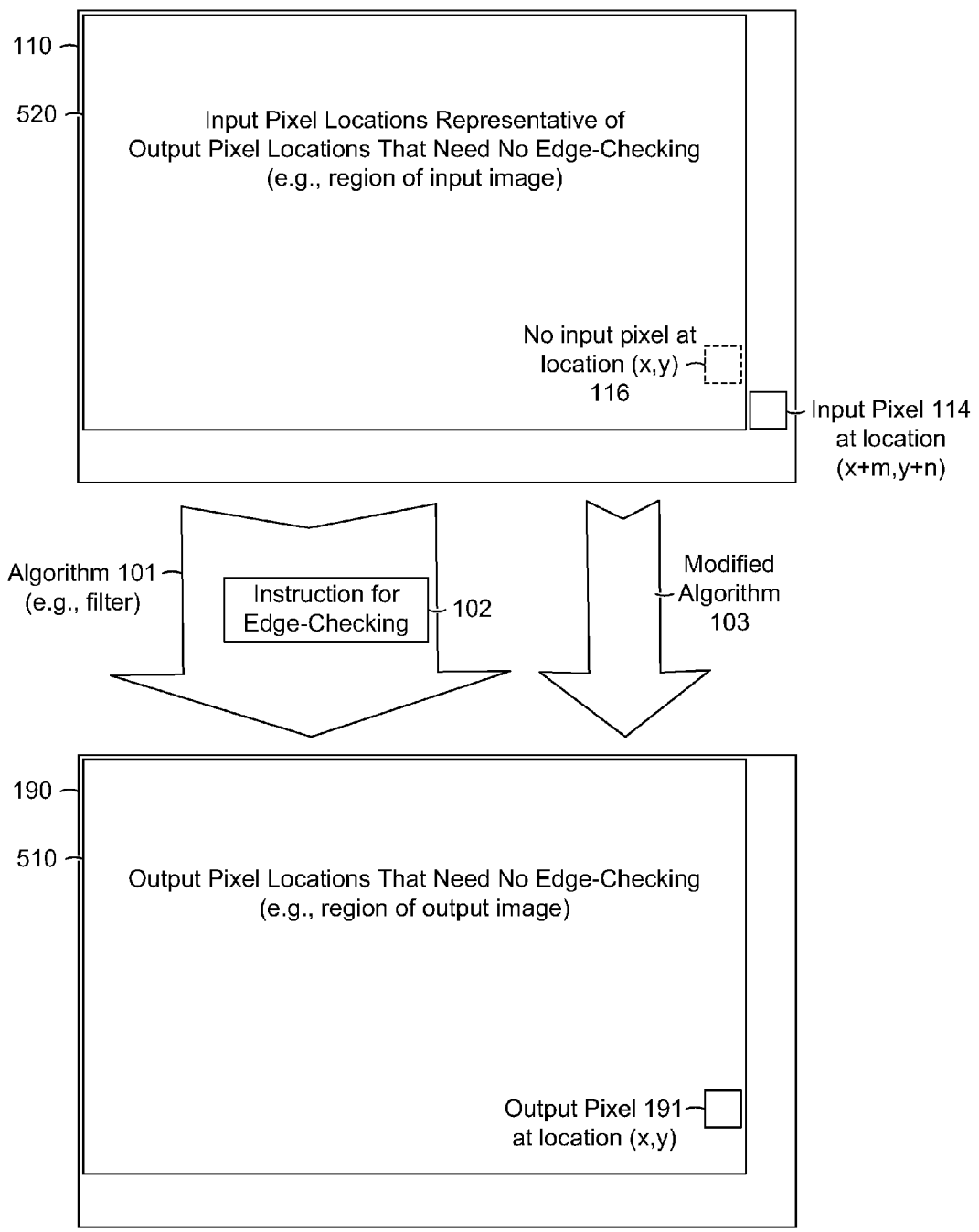

In FIG. 5, an output region 510 has been identified within the output image 190. The output region 510 contains output pixel locations (e.g., pixel location (x, y)) that need no edge-checking operation with respect to the algorithm 101. As shown in FIG. 5, to generate the output pixel 191 at location (x, y) in the output image 190, the algorithm 101 takes as input pixel value from the input pixel 114 at location (x+m, y+n) in the input image 110. Because the input pixel 114 is located inside the input image 110, no edge-checking operation is necessary to generate an output pixel value for the output pixel 191. This is the case for all output pixel values to be generated for output pixel locations within the output region 510. Because no edge checking operation is necessary within the output region 510, a modified algorithm 103 may be generated. The modified algorithm 103 is a version of the algorithm 101 that lacks the instruction 102 to perform the edge checking operation.

In general, the input image 110 and the output image 190 need not be of the same size, dimensions, or shape. Furthermore, the input image 110 and the output image 190 need not occupy the same region in the coordinate space. In some example embodiments, however, the output image 190 has a same size, dimensions, and shape of the input image 110. For example, the algorithm 101 may simply modify the colors of the input image 110 to generate the output image 190. In such a case, an input region 520 may be identified as representative of the output region 510. The input region 520 contains input pixels that correspond to output pixels (e.g., output pixel 191) within the output region 510. The input region 520 may be stored as metadata of the input image 110. This has the effect of facilitating subsequent applications of the algorithm 101, or other algorithms having the same pixel offset, to the input image 110 by rendering it unnecessary to repeat the identification of the input region 520 or the output region 510.

Although the output region 510 is shown as a portion of the output image 190, the output region 510 may encompass the entirety of the output image 190. In this situation, none of the output pixels (e.g., output pixel 191) in the output image 190 need the edge-checking operation. The algorithm 101 is called a "pointwise" algorithm or filter. The situation is illustrated in FIG. 1.

Figure 6:
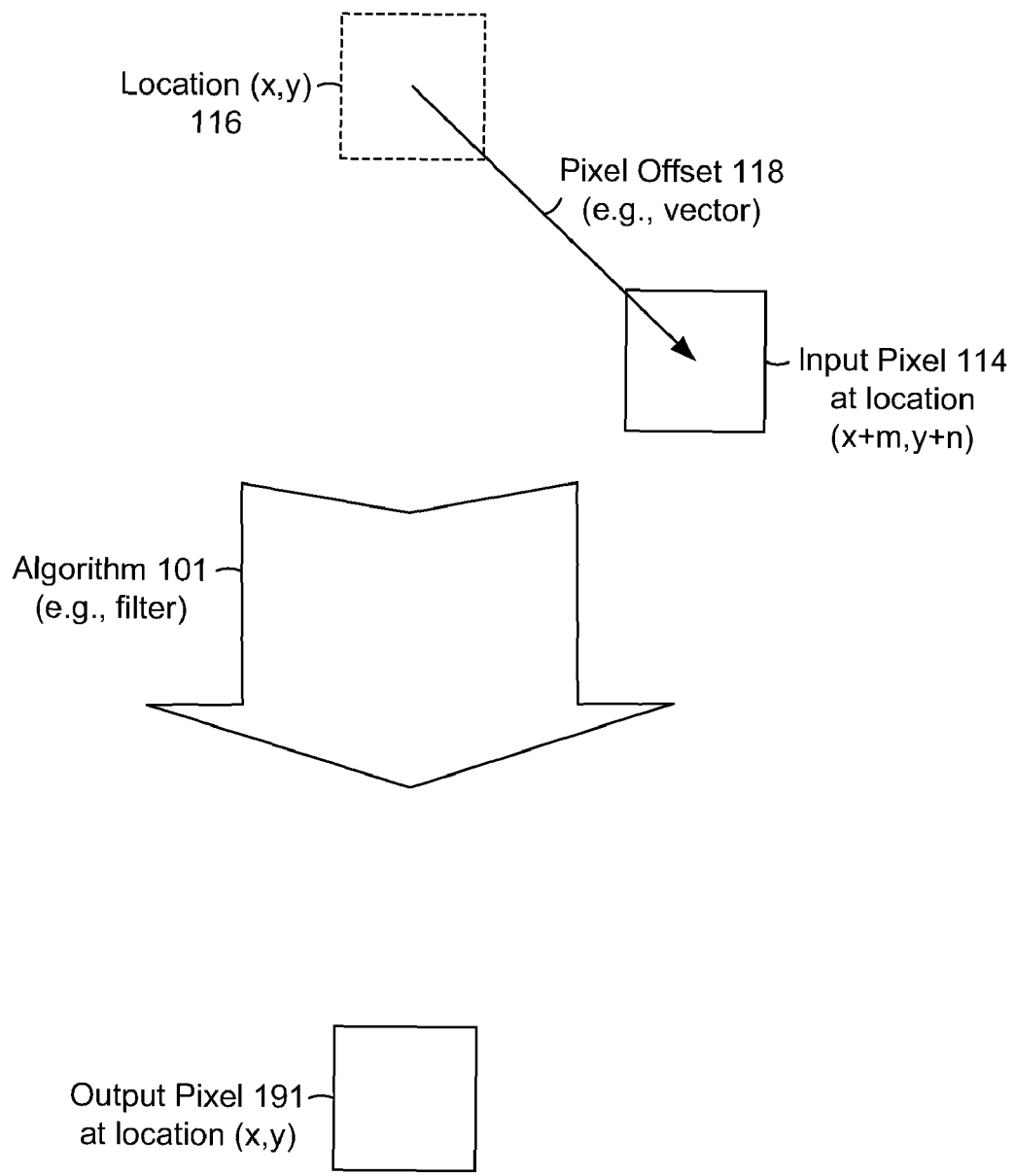
FIG. 6 is a diagram illustrating application of an image modification algorithm to an input pixel in order to generate an output pixel, according to some example embodiments.

FIG. 6 is a diagram illustrating application of the algorithm 101 being applied to an input pixel 114 to generate an output pixel 191, according to some example embodiments. As used herein, generation of an output pixel based on an input pixel refers to generating an output pixel value of the output pixel based on an input pixel value of the input pixel. As shown in FIG. 6, the output pixel 191 to be generated is located at a specific pixel location (x, y).

The algorithm 101 has a pixel offset 118. The pixel offset 118 is a vector that determines the relative position of the input pixel 114 with respect to the pixel location (x, y) of the output pixel 191. Being a vector, the pixel offset 118 has a magnitude (e.g., a distance) and a direction. As illustrated, the input pixel 114 is located at pixel location (x+m, y+n). Accordingly, the pixel offset 118 may be specified as (+m, +n), which defines a pixel distance and a direction (e.g., lower right). Although the algorithm 101 is shown and discussed as having one pixel offset 118, in general the algorithm 101 may have multiple pixel offsets. For example, as shown in FIG. 2, the algorithm 101 has at least three input pixels 112-114, each having a different input pixel location relative to the output pixel location of the output pixel 191. Hence, the algorithm 101 has at least three different pixel offsets. According to various example embodiments, the pixel offset 118 is a maximum pixel offset.

Although the pixel offset 118 is shown and described as a fixed pixel offset (e.g., with a fixed pixel distance and a fixed direction), in some example embodiments, the pixel offset 118 may vary. For example, the pixel offset 118 may vary depending on the output pixel location, an input pixel location, input pixel values of one or more input pixels (e.g., input pixels 112-114), metadata of the input image 110, a format of the output image 190, a date, a time, or any combination thereof. In certain example embodiments, the algorithm 101 accepts additional parameters as input, and these parameters affect the determination of the pixel offset 118.

In some example embodiments, the direction of the pixel offset 118 may be any spatial direction with respect to the coordinate space, including left, right, up, down, top, bottom, upper left, upper right, lower left, lower right, top left, top right, bottom left, bottom right, and any combination thereof. The pixel distance of the pixel offset 118 (e.g., the square root of the sum of $m^2+n^2$) may be any spatial distance with respect to the coordinate space, including zero distance. For example, the pixel offset 118 is a zero vector where the algorithm 101 is a pointwise algorithm. As another example, the pixel offset 118 is a nonzero vector where the algorithm 101 is not a pointwise algorithm.

Figure 7:
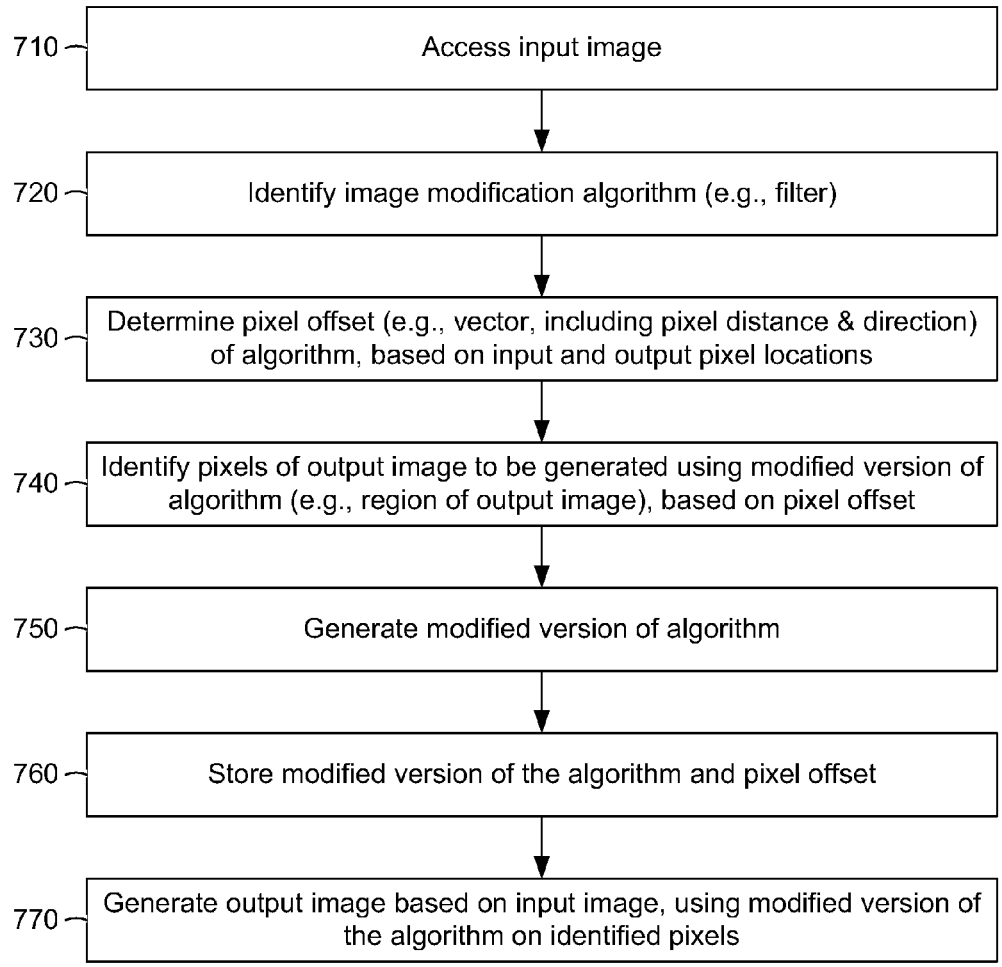
FIGS. 7-8 are flowcharts illustrating operations in a method of generating the output image based on the input image using a modified version of the algorithm, according to some example embodiments.
Figure 8:
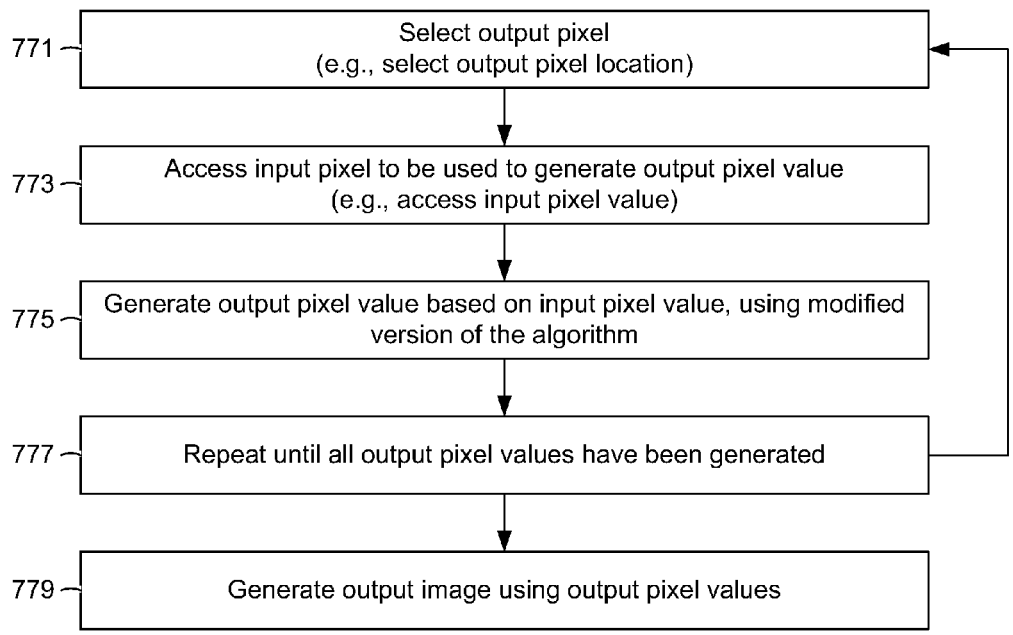

FIGS. 7-8 are flowcharts illustrating operations in a method 700 of generating the output image 190 based on the input image 110 using a modified version of the algorithm, according to some example embodiments. The method 700 includes operations 710-770, all of which may be performed by an algorithm modification machine (see FIG. 9), which may in turn be implemented as a processor configured by software. In some example embodiments, operations 710-740 are performed by an analysis module (e.g., FIG. 9, analysis module 905) of the algorithm modification machine, and operations 750-770 are performed by a generation module (e.g., FIG. 9, generation module 907) of the algorithm modification machine. Operations 710-770 are shown in FIG. 7. FIG. 8 illustrates details of operation 770; these details are shown as operations 771-779. In some example embodiments, these modules may be processor-implemented in that they may be implemented by a processor which is temporarily or permanently configured by software perform the described operations.

At operation 710, an analysis module of the algorithm modification machine accesses the input image 110. The input image 110 is to be modified, with the modification resulting in generation of the output image 190. In some example embodiments, the algorithm modification machine reads the input image 110 from a memory, where the input image 110 is stored. As another example, the input image 110 may be accessed by receiving the input image 110 via a network.

At operation 720, the analysis module of the algorithm modification machine identifies the algorithm 101 to be used in generating the output image 190. As noted above, the algorithm 101 is to generate an output pixel value of the output pixel 191 based on an input pixel value of the input pixel 114. In certain example embodiments, multiple algorithms are available for processing the input image 110, and the algorithm modification machine may identify the algorithm 101 based on user input. For example, the algorithm modification machine may receive a user-generated selection indicating that one of the multiple algorithms (e.g., algorithm 101) is to be used. The algorithm modification machine, according to some example embodiments, may identify the algorithm 101 by reading a stored list (e.g., a script file, or a batch file) of one or more algorithms to be applied to the input image 101.

At operation 730, the analysis module of the algorithm modification machine determines the pixel offset 118 (e.g., vector), based on the input pixel location of the input pixel 114 (e.g., (x+m, y+n)) and on the output pixel location of the output pixel 191 (e.g., (x, y)). This determination may involve determining a pixel distance, a direction, or any combination thereof.

At operation 740, the analysis module of the algorithm modification machine identifies the output region 510, which contains one or more output pixels (e.g., output pixel 191) to be generated using a modified version of the algorithm 101. The output region 510 need not be a single contiguous region of the output image 190. In some example embodiments, multiple noncontiguous sets of output pixels collectively constitute the output region 510. According to certain example embodiments, the output region 510 constitutes the entirety of the output image 190. In various example embodiments, operation 740 further involves identifying the input region 520, as discussed above with respect to FIG. 5, and storing the input region 520 as metadata of the input image 110.

At operation 750, a generation module of the algorithm modification machine generates the modified algorithm 103, which is a modified version of the algorithm 101. The modified algorithm 103 lacks at least one edge-checking operation. In some example embodiments, the algorithm 101 includes an instruction to determine that the input pixel 114 is located inside the input image 110, and the generation of the modified version of the algorithm 101 omits this instruction from the modified version. In certain example embodiments the algorithm 101 includes an instruction (e.g., instruction 102) to determine the input pixel location of the input pixel 114 relative to an edge of the input image 110, and the generation of the modified version omits this instruction from the modified version. This has the effect of generating the modified version of the algorithm 101 without the instruction. For example, the algorithm 101 may include an instruction to determine whether the input pixel 114 is located outside the right edge of the input image 110, and the generation module may omits this instruction from the modified algorithm 103. According to some example embodiments, the modified algorithm 103 produces the same results as the algorithm 101 in its original unmodified form. As a result, the modified algorithm 103 utilizes fewer computing resources to generate an output pixel value from an input pixel value.

At operation 760, the generation module of the algorithm modification machine stores the modified algorithm 103 and the pixel offset 118, as corresponding to each other, in a database. In some example embodiments, the pixel offset 118 is stored with the algorithm 101 in the database. This has the effect of allowing the pixel offset 118 to be accessed along with the algorithm 101, without any need to reanalyze the algorithm 101 to determine the pixel offset 118.

At operation 770, the generation module of the algorithm modification machine generates the output image 190 based on the input image 110, using the modified algorithm 103. The modified algorithm 103 is used to generate output pixel values for output pixels (e.g., output pixel 191) in the output region 510 of the output image 190. In some example embodiments, the generation module uses a non-modified version (e.g., an original version) of the algorithm 101 to generate output pixel values for output pixels outside of the output region 510.

Further details of operation 770 are shown in FIG. 8 as operations 771-779. As noted above, in various example embodiments, operation 770 is performed by a generation module (e.g., FIG. 9, generation module 907) of the algorithm modification machine. Accordingly, any one or more of operations 771-779 may be performed by the generation module.

At operation 771, the generation module selects the output pixel 191 as the output pixel to be generated. For example, the generation module may select the output pixel 191 by sequentially selecting pixels in a row or column of the output image 190 to be generated. Specifically, operation 771 involves selecting the output pixel location of the output pixel 191 (e.g., pixel location (x, y)).

At operation 773, the generation module accesses the input pixel 114 to be used to generate the output pixel value of the output pixel 191. In particular, operation 773 involves accessing an input pixel value of the input pixel 114. For example, the generation module may read the input pixel value from a memory, or the input pixel value is stored.

At operation 775, the generation module generates the output pixel value of the output pixel 191 based on the input pixel value of the input pixel 114. More specifically, operation 775 involves processing the input pixel value using the modified algorithm 103 to obtain the output pixel value.

At operation 777, the generation module iterates operations 771-775 until all output pixel values to be generated have been generated. In other words, operations 771-775 are repeated until each output pixel (e.g., output pixel 191) in the output region 510 has an output pixel value, as generated by the modified algorithm 103.

At operation 779, the generation module generates the output image 190 using the output pixel values of the output pixels (e.g., output pixel 191). For example, the generation module may assemble the output pixel values into a data structure representing the output image 190 (e.g., an image file). Regions of the output image 190 that lie outside the output region 510 may contain output pixels with output pixel values generated by other modified versions of the algorithm 101. In some example embodiments, one or more regions outside of the output region 510 may contain an output pixel having an output pixel value generated by a non-modified version (e.g., original version) of the algorithm 101. The generating of the output image 190 may further involve storing the output image 190 in a database, a memory, or any combination thereof.

Figure 9:
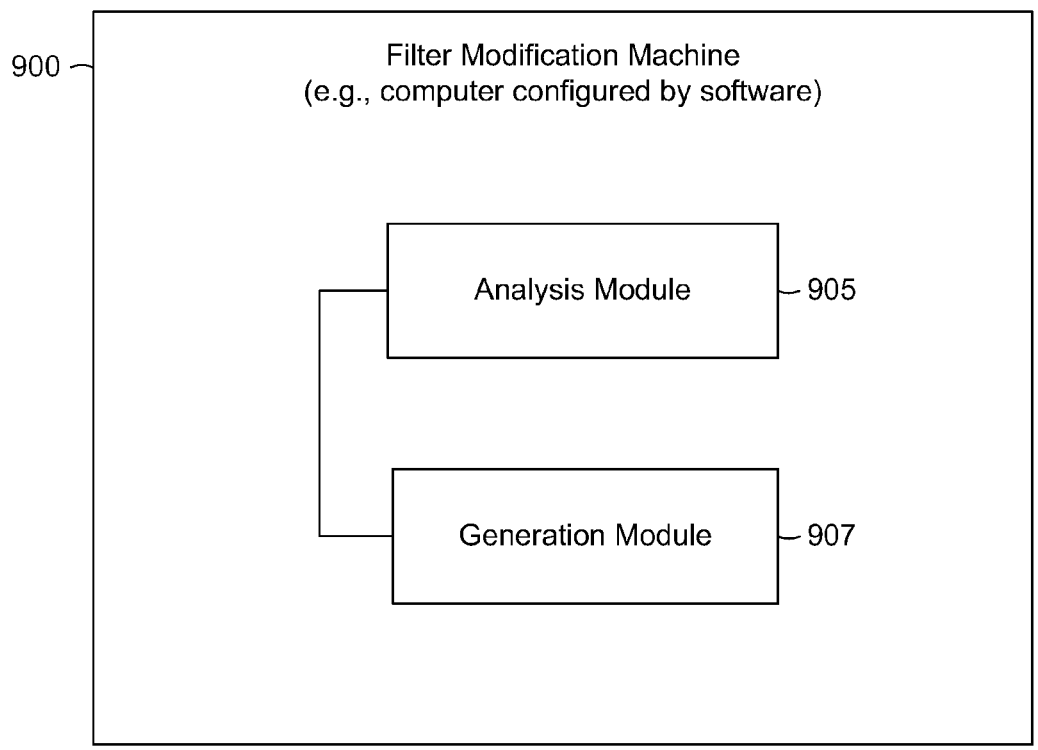
FIG. 9 is a block diagram of an algorithm modification machine, according to some example embodiments.

FIG. 9 is a block diagram of the algorithm modification machine 900, according to some example embodiments. The algorithm modification machine 900 is able to perform any one or more of the methodologies discussed herein (e.g., operations 710-779). In some example embodiments, the algorithm modification machine 900 may be a general-purpose computer configured by software as a special-purpose computer. The algorithm modification machine 900 includes an analysis module 905 and a generation module 907 configured to communicate with the analysis module 905. According to some example embodiments, the analysis module 905, the generation module 907, or both may be implemented as software (e.g., software stored in a memory) executed using one or more processors.

The analysis module 905 accesses the input image 110, identifies the algorithm 101, analyzes the algorithm 101, and determines the pixel offset 118 of the algorithm 101. The generation module 907 identifies the output region 510 and generates the modified version of the algorithm 101.

According to some example embodiments, the algorithm 101 includes the instruction 102 to perform an edge-checking operation (e.g., to determine the input pixel location of the input pixel 114 relative to an edge of the image 110), and the generation module 907 generates the modified version of the algorithm 101 (e.g., modified algorithm 103) without the instruction 102. In certain example embodiments, the generation module 907 generates the output image 190 based on the input image 110 using the modified algorithm 103. According to various example embodiments, the generation module 907 selects an output pixel (e.g., output pixel 191) from the output region 510 and accesses the input pixel 114 using the pixel offset 118. The generation module 907 uses the input pixel value of the input pixel 114 to generate the output pixel value of the output pixel 191, using the modified algorithm 103. As noted above, the pixel offset 118 may include a pixel distance, which may be nonzero.

In certain example embodiments, one or more of the methodologies described herein may facilitate a reduction in usage of computing resources (e.g., processor cycles, bus traffic, network traffic, or thermal cooling load) involved in using the algorithm 101 to modify the input image 110 and obtain the output image 190. By identifying the output region 510 and generating its output pixel values by using the modified algorithm 103, one or more edge-detection operations may be eliminated from the algorithm 101 for those output pixel values. This has the effect of decreasing the number of instructions involved in generating those output pixel values.

Figure 10:
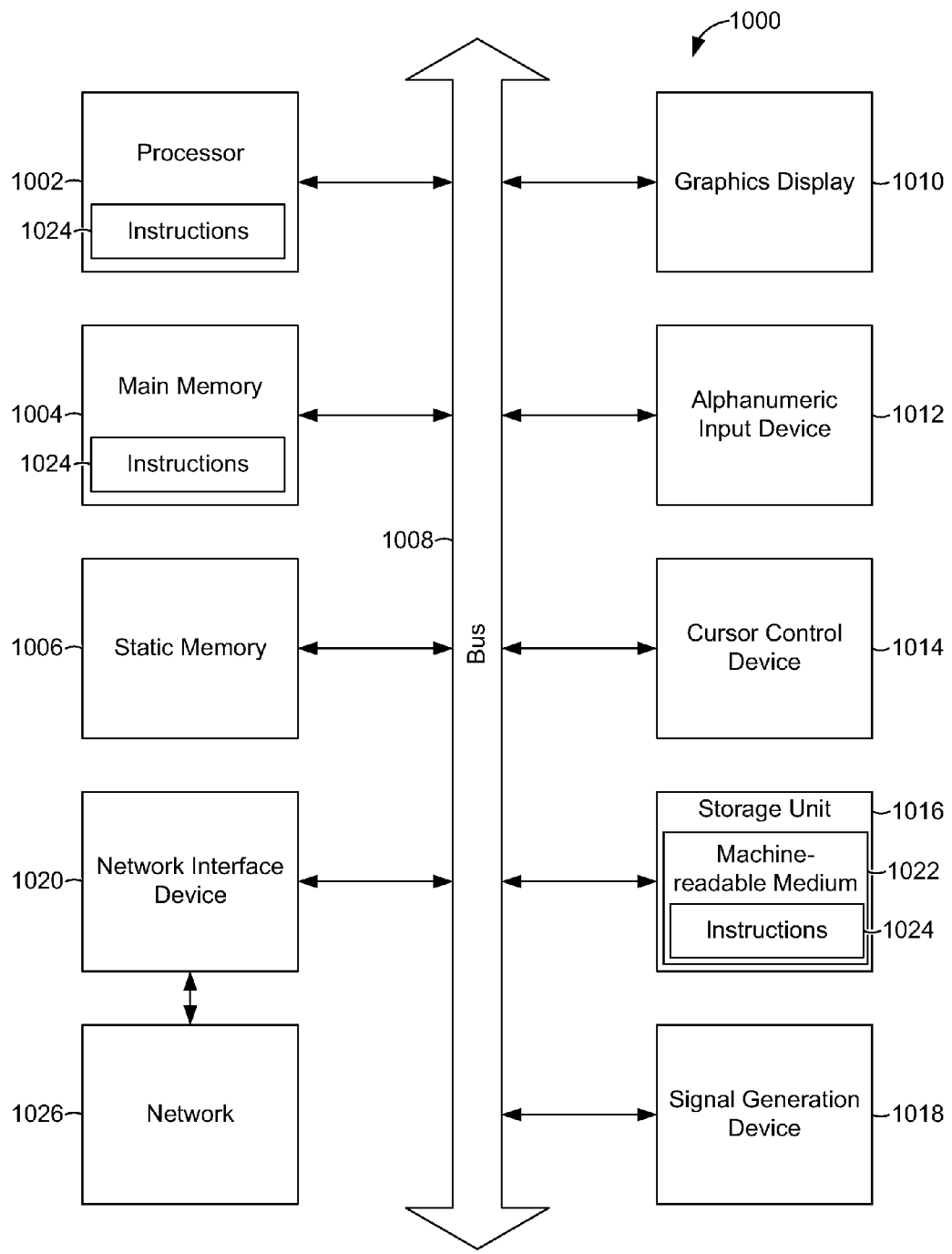
FIG. 10 is a block diagram illustrating components of a machine, according to some example embodiments, able to read instructions from a machine-readable medium and perform any one or more of the methodologies discussed herein.

FIG. 10 illustrates components of a machine 1000, according to some example embodiments. The machine 1000 is able to read instructions from a machine-readable medium (e.g., machine-readable storage medium) and perform any one or more of the methodologies discussed herein. Specifically, FIG. 10 shows a diagrammatic representation of the machine 1000 in the example form of a computer system and within which instructions 1024 (e.g., software) for causing the machine 1000 to perform any one or more of the methodologies discussed herein may be executed. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The algorithm modification machine 900 may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes the processor 1002 (e.g., a central processing unit (CPU), a graphics processing unit (GPU), a digital signal processor (DSP), an application specific integrated circuit (ASIC), a radio-frequency integrated circuits (RFIC), or any combination thereof), a main memory 1004, and a static memory 1006, which communicate with each other via a bus 1008. The machine 1000 may further include a graphics display unit 1010 (e.g., a plasma display panel (PDP), a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, during execution thereof by the machine 1000, the main memory 1004 and the processor 1002 also constituting machine-readable media. The instructions 1024 may be transmitted or received over a network 1026 via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., software) for execution by the machine and that cause the machine to perform any one or more of the methodologies described herein. The term "machine-readable medium" shall accordingly be taken to include, but not be limited to, a data repository in the form of a solid-state memory, an optical medium, a magnetic medium, or any combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A non-transitory machine-readable storage medium storing instructions that, when executed by one or more processors of a machine, cause the machine to perform operations comprising:

accessing an input image to be modified into an output image;

identifying an algorithm to generate an output pixel value based on an input pixel value, the output pixel value corresponding to an output pixel having an output pixel location and the input pixel value corresponding to an input pixel having an input pixel location;

determining a pixel offset corresponding to the algorithm, the pixel offset including a pixel distance between the input pixel location and the output pixel location;

identifying a plurality of pixels of the output image based on the pixel offset, the identifying of the plurality of pixels being performed by a hardware module of the machine; and generating a version of the algorithm corresponding to the plurality of pixels.

2. The non-transitory machine-readable storage medium of claim 1, wherein:
the algorithm includes an instruction to determine the input pixel location relative to an edge of the input image; and
the generating of the version of the algorithm omits the instruction from the version of the algorithm.

3. The non-transitory machine-readable storage medium of claim 1, wherein the operations further comprise:
selecting the output pixel from the plurality of pixels;
accessing the input pixel based on the pixel offset; and
generating the output pixel value based on the input pixel value and using the version of the algorithm.

4. The non-transitory machine-readable storage medium of claim 1, wherein the operations further comprise:
generating the output image based on the input image and on the version of the algorithm.

5. The non-transitory machine-readable storage medium of claim 1, wherein:
the pixel distance is nonzero.

6. The non-transitory machine-readable storage medium of claim 1, wherein:
the pixel offset includes a direction selected from a group consisting of left, right, up, down, top, bottom, upper left, upper right, lower left, lower right, top left, top right, bottom left, and bottom right.

7. The non-transitory machine-readable storage medium of claim 1, wherein the operations further comprise:
storing the version of the algorithm with the pixel offset.

8. A system comprising:
a memory;
a hardware-implemented analysis module communicatively coupled to the memory, the analysis module to:
access an input image stored in the memory, the input image to be modified into an output image;
identify an algorithm to generate an output pixel value based on an input pixel value, the output pixel value corresponding to an output pixel having an output pixel location and the input pixel value corresponding to an input pixel having an input pixel location;
determine a pixel offset corresponding to the algorithm, the pixel offset including a pixel distance between the input pixel location and the output pixel location; and
a hardware-implemented generation module communicatively coupled to the analysis module, the generation module to:

identify a region of the output image based on the pixel offset, the region of the output image to correspond to a version of the algorithm; and
generate the version of the algorithm.

9. The system of claim 8, wherein:
the algorithm includes an instruction to determine the input pixel location relative to an edge of the image; and
the generation module is to generate the version of the algorithm without the instruction.

10. The system of claim 8, wherein:
the generation module is to:
select a pixel from the region of the output image as the output pixel;
access the input pixel using the pixel offset; and
generate the output pixel value based on the input pixel value and using the version of the algorithm.

11. The system of claim 8, wherein:
the generating module is to generate the output image based on the input image and using the version of the algorithm.

12. The system of claim 8, wherein:
the pixel distance is nonzero.

13. A method comprising:
accessing an input image to be modified into an output image;
identifying an algorithm to generate an output pixel value based on an input pixel value, the output pixel value corresponding to an output pixel having an output pixel location and the input pixel value corresponding to an input pixel having an input pixel location;
determining a pixel offset corresponding to the algorithm, the pixel offset including a pixel distance between the input pixel location and the output pixel location;
identifying a plurality of pixels of the output image based on the pixel offset, the identifying of the plurality of pixels being performed by a hardware module of a machine; and
generating a version of the algorithm corresponding to the plurality of pixels.

14. The method of claim 13, wherein:
the algorithm includes an instruction to determine the input pixel location relative to an edge of the input image; and
the generating of the version of the algorithm omits the instruction from the version of the algorithm.

15. The method of claim 13 further comprising:
selecting the output pixel from the plurality of pixels;
accessing the input pixel based on the pixel offset; and
generating the output pixel value based on the input pixel value and using the version of the algorithm.

16. The method of claim 13 further comprising:
generating the output image based on the input image and on the version of the algorithm.

17. The method of claim 13, wherein:
the pixel distance is nonzero.

18. The method of claim 13, wherein:
the pixel offset includes a direction selected from a group consisting of left, right, up, down, top, bottom, upper left, upper right, lower left, lower right, top left, top right, bottom left, and bottom right.

19. The method of claim 13 further comprising:
storing the version of the algorithm with the pixel offset.

* * * * *